R. G. WEISSEL.
AUTOMOBILE LOCK.
APPLICATION FILED DEC. 17, 1919.
1,363,448.
Patented Dec. 28, 1920.
2 SHEETS—SHEET 1.
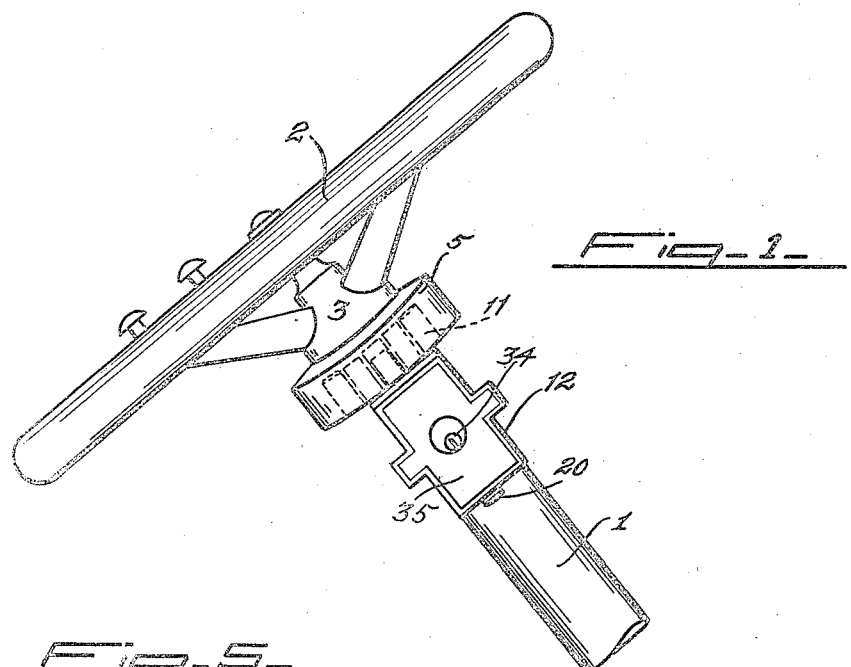
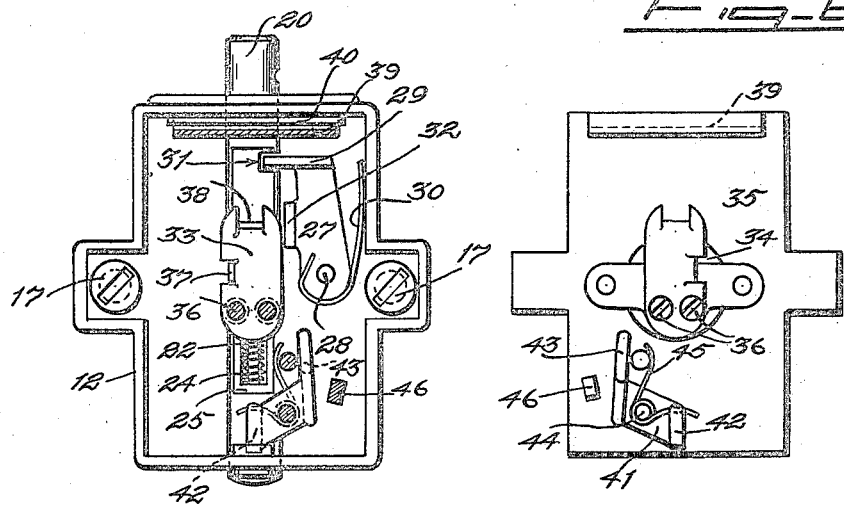
WITNESS
INVENTOR
Robert G. Weissel
BY
Acker + Totten
ATTORNEYS

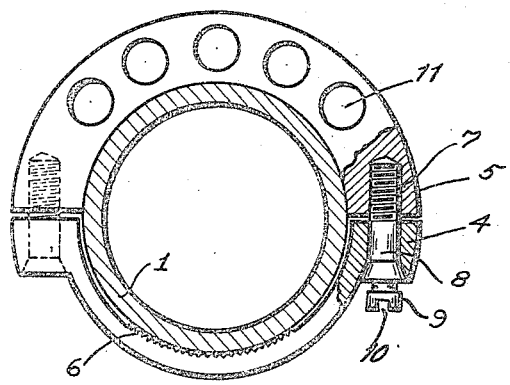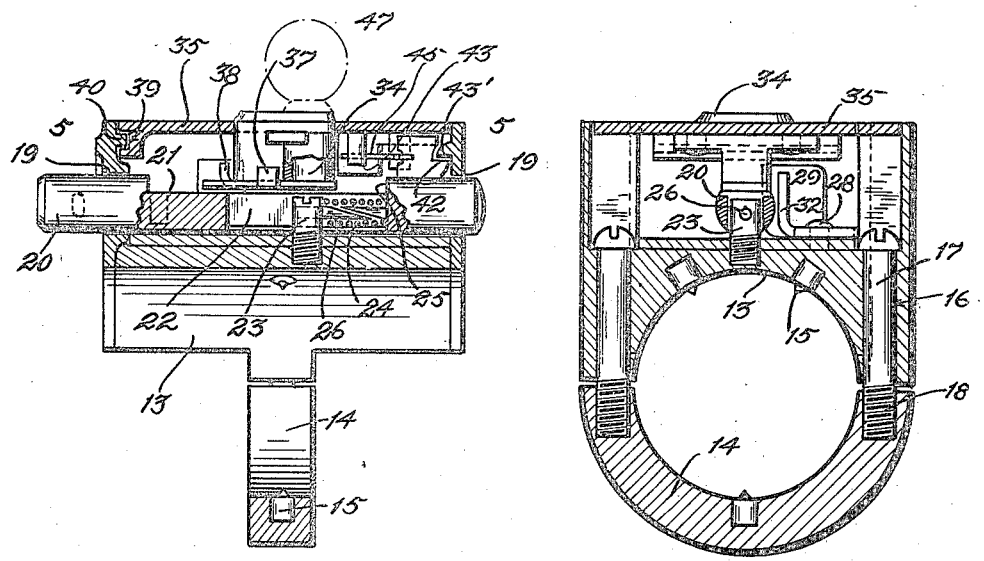

UNITED STATES PATENT OFFICE.

ROBERT G. WEISSEL, OF OAKLAND, CALIFORNIA.

AUTOMOBILE-LOCK.

1,363,448.     Specification of Letters Patent.     Patented Dec. 28, 1920.

Application filed December 17, 1919. Serial No. 345,624.

*To all whom it may concern:*

Be it known that I, ROBERT G. WEISSEL, a citizen of the United States, residing at the city of Oakland, county of Alameda, and State of California, have invented certain new and useful Improvements in Automobile-Locks, of which the following is a specification.

The present invention relates to a locking device for precluding the movement of an automobile steering wheel whereby the wheel may be locked, enabling the steering of the vehicle to be prevented, thereby preventing the use of the vehicle by unauthorized persons.

Locks of this type have been heretofore provided, but in the mounting thereof the securing means have been exposed, enabling one with few tools to readily remove the lock from the steering post and thereby defeat the purpose thereof.

One of the principal objects of the present invention is to provide a lock construction whereby the means for securing the lock to the vehicle steering column are concealed and access thereto is precluded, and during such time as the lock is in operative or locked position, preventing the removal of the lock from the steering column.

A further object is to provide a construction which is capable of being readily attached to a vehicle steering column at such time as the cover of the lock casing is removed, and whereby on the positioning of the cover on the lock casing and the operating of the lock to locking position access to the securing or attaching means is prevented, precluding the removal of the casing from the steering column. A further object is to provide a locking collar capable of being readily attached to the steering-wheel hub, and when once attached the same is prevented from removal. A further object is to provide a latch mechanism for retaining the locking bolt in its locked position and a separate latch mechanism for retaining the cover on the lock casing, and positioning into coöperative relation with both mechanisms a member rotatable with a locking barrel and which is adapted when moved into one direction for releasing the latch associated with the locking bolt and when rotated to another position, when the bolt is in unlocked position to release the latch retaining cover on the case.

With the above mentioned and other objects in view the invention consists in the novel construction and combination of parts hereinafter described illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings,

Figure 1 is a view of the preferred embodiment of my invention mounted on the steering column of a vehicle steering wheel and in locked position.

Fig. 2 is a longitudinal sectional view of the lock casing.

Fig. 3 is a transverse sectional view of the lock casing.

Fig. 4 is a view in bottom elevation of the locking collar, mounted on the steering-wheel hub.

Fig. 5 is a view in plan of the lock casing with the cover removed therefrom, and illustrating one of the cover engaging flanges in section.

Fig. 6 is a bottom plan view of the cover for the lock casing.

Referring to the drawings wherein like characters of reference designate corresponding parts, 1 indicates a vehicle steering post mounting the usual steering-wheel 2, which is free to rotate relatively to the steering-post 1.

Secured to the hub 3 of the steering-wheel 2, is a suitable locking collar consisting of the split semi-circular sections 4 and 5, one or both of which is provided on its interior surface with serrations or teeth, thus adapted on the drawing together of said sections to bite into the hub 3 and prevent the rotation of the collar thereabout. The sections 4 and 5 are provided at opposite sides with alined openings 7 through which are adapted to pass the securing screws 8, said screws each being provided with a shank 9, having a slotted portion 10, for the reception of a tool on the drawing together of said collar sections 4 and 5. On the movement or drawing together of the collar sections 4 and 5 about the hub 3, as indicated in Fig. 4, the shanks 9 of the screws 8 are broken or severed from the head of the screw by any suitable mechanism, leaving a smooth head for the screw flush with the outer surface of the opening in the member 4 as designated in dotted lines, at the right-hand side of Fig. 4 of the drawing. The section 5 of the collar is provided on its underface with a plurality of locking bolt receiving openings 11, extending parallel with the steering-post 1, and opening downwardly.

Coöperating with the collar which is secured to the steering-wheel hub is a locking mechanism carried by the steering-post 1, as illustrated in Fig. 1 of the drawings, and said locking mechanism comprises an open-top hollow casing 12, the under portion of which is formed with a semi-circular depression 13, for partially encircling the steering-column 1. Coöperating with the semi-circular portion 13 is a correspondingly formed shell 14 for inclosing or encircling the remaining portion of the steering column 1. To preclude lineal or rotative movement of the casing 12, about the steering-column 1, I provide the portions 13 and 14 with inwardly extending pins or projections 15, for puncturing the surface of the steering-column 1 on the drawing together of the sections 13 and 14. The shell 12 is provided in its side walls with the open-ended screw receiving bores 16, in which are adapted to be received screws 17, the heads of which are received within said casing 12 and threaded lower ends 18, which have threaded engagement with suitable openings in the shell 14. The tightening or adjusting of the screws 17 tightly clamps the casing 12 onto the steering column 1.

Disposed parallel to the steering-column 1, and mounted to reciprocate at its opposite ends in guide openings 19 in the end walls of the casing 12, is a suitable locking bolt 20, of a length greater than that of the casing 12. The bolt is provided on its upper surface within the casing 12, with a cut-out or depression 21, and is also formed with a vertical longitudinally disposed slot 22 upwardly into which extends a guide screw 23 to preclude axial movement of the bolt within the casing and to limit the movement of the bolt to unlocked position. Positioned between said guide screw and the rear end wall 25 of the slot 22 is a coiled spring 24 for normally maintaining the bolt in its unlocked position. The spring coiled about a sectional guide pin 26 one portion of which is carried by the screw 23 and another portion of which projects forwardly from the rear wall 25. To maintain the bolt 20 in its locked position as indicated in Fig. 5, I provide a latch 27, fulcrumed as at 28 to the bottom of the casing 12, and provided at its forward or free end with a tongue 29 extending laterally toward said bolt and adapted on the movement of the bolt to locked position to be received by the action of a compression spring 30, within a notch 31, in the bolt side wall. A flange 32 extends upwardly from the latch 27 adjacent the side of the bolt 20, and the same is adapted for engagement by a suitable plate 33 mounted on the lower end of a key-operated locking barrel 34, mounted with a cover plate 35 which is adapted for positioning over to close the upper open top of the casing 12. The plate is preferably attached at one end to the lower end of the locking barrel by suitable screws or other fastening means 36, Figs. 5 and 6 of the drawings, and at one side edge carries the upwardly bent lip 37, and at its free end carries the upwardly bent tongue 38, Figs. 2 and 5 of the drawings.

The cover 35 is provided at one end with a channel 39 in which is received the flange 40 projecting inwardly from the end wall of the receptacle 12. On its under surface at its opposite end the cover carries a suitable latch 41 consisting of a flat plate, the opposite ends of which are bent to lie at substantially right angles to the under-face of the cover 35, providing adjacent the end wall of the cover a catch 42, which is adapted to lie beneath a suitable flange 43' extended inwardly from the end wall of the casing 12, Fig. 2 of the drawings. The opposite flanged portion of the latch 41 provides a member 43, with which the bent lip 37 of the plate 33 is adapted to contact on the rotation of the locking barrel, as hereinafter described. The latch 41 fulcrums about a pin 44 and pressure is exerted to normally force the tongue 42 thereof outwardly by a suitable spring 45. A suitable stop 46 is provided on the under-surface of the cover 35, to preclude the pivotal movement of the latch 41 about the plate 33.

The device being assembled as in the drawings, with the collar secured to the hub of the steering-wheel and the case 12 secured to the steering-column 1, the same operates in the following manner:

The insertion of the controlling key 47 within the locking barrel 34 permits the operator to rotate the locking barrel in a clockwise direction, and in so doing one edge of the plate 33 engages the portion 32 pivoting the latch 27 on its fulcrum and withdrawing the end of the portion 29 from the notch 31, at which time the bolt 20 is moved to unlocked position by the tension of the spring 24. If the operator so desires the locking barrel 34 may be then rotated in a contra-clockwise direction, until the portion 37 of the plate 33 contacts with the portion 43 of the latch 41, pivoting the latch on its fulcrum 44 and withdrawing the catch 42 from beneath the flange 43' at which time the cover is unlocked and is capable of being removed from the case 12 by an upward movement of said cover. The removal of the cover from the case exposes the head screw 17, and enables, if it is so desired, the detachment of the case from the steering-wheel column. To position the cover on the case the flange 40 is first inserted into the slot 39 and then the lower end of the cover is pressed downwardly until such time as the catch 42 snaps beneath the flange 43′, thus concealing all operating parts from view. To throw the locking bolt 20 to locked position the operator merely presses the lower end thereof, forcing the same upwardly or longitudinally of the casing to the position indicated in Figs. 1, 2 and 5 of the drawings, at which time the member 29 snaps into the recess 31. When in this position, it is impossible to remove the cover from the case as the rotating of the locking barrel 34 in a contra-clockwise direction is limited by the contact of the free end of the plate 33 with the end wall 25 of the depression 21, which is moved on the locking of the bolt into the path of rotative movement in a contra-clockwise direction of the member 33, preventing the same from passing beyond said bolt, which precludes the contacting of the member 37 with the member 43.

It will be apparent that I have provided a construction wherein the collar associated with the steering-wheel hub when once mounted in position is precluded from detachment and wherein the attaching means for securing the casing to the column is concealed by the casing cover which is precluded from removal from the casing during such time as the bolt is in locked or operative position.

Having thus described my invention what I claim is:

1. An automobile steering wheel lock including a split casing adapted to be secured to the vehicle steering column, means within said casing for securing the split sections thereof to said steering column, a locking bolt within said casing, a collar carried by the steering wheel and provided with a recess for receiving said bolt, a spring held latch carried by the casing for retaining said bolt in locking position, a removable cover for said casing for concealing said latch, a locking barrel carried by and movable with said cover and adapted for rotation to release said bolt retaining latch, a spring held latch carried on the under side of the cover for engaging the casing to retain the cover in position thereon and releasable by rotative movement of said locking barrel, said locking bolt when in locked position precluding rotative movement of said locking barrel to release said cover retaining latch.

2. An automobile steering wheel lock including a casing adapted to be secured to the vehicle steering column, means passing through the casing and removable only through the casing for securing the same in position on the column, a collar carried by the steering wheel, a bolt carried by the casing for movement into locked position for engagement with the collar to lock the wheel from movement, a spring held latch for engaging said bolt to retain the same in locked position, a cover removably associated with the casing a spring held latch carried by the cover for engaging the casing for locking the cover thereto, a lock carried by and rotatable within the cover and capable of rotation in one direction to release said bolt and thence capable of rotative movement in a reverse direction for releasing said cover locking latch, and a projection on said bolt for movement within the path of rotation of said lock when said bolt is in its locked position for precluding rotative movement of said lock to release said cover latch.

3. A locking apparatus including a recessed casing, a removable cover for closing the recess therein, a locking member carried by the casing for projecting beyond the same to locked position, a spring held release latch for engaging and retaining the locking member in locked position, a spring held latch carried by the cover for locking the same to the casing, a key actuated rotatable lock barrel, and a plate extended laterally from the inner end of said barrel and adapted for movement on the rotation of the barrel to coöperate with the bolt and cover locking latches whereby the same are capable of being selectively released.

4. A locking apparatus including a recessed casing, a removable cover for closing the recess therein, a locking member carried by the casing for projecting beyond the same to locked position, releasable means carried by the casing for retaining the locking member in locked position, means carried by the cover for engaging the casing for locking the cover thereto, a key actuated lock carried by and movable with the casing and adapted for rotation therein to coöperate with the bolt and cover locking means whereby the same are capable of being selectively released, means on said bolt for movement into the path of operation of said lock for precluding operation of the same to release said cover locking means.

In testimony whereof I have signed my name to this specification in the presence of two subscribing witnesses.

ROBERT G. WEISSEL.

Witnesses:
HARRY A. TOTTEN,
D. B. RICHARDS.